(12) United States Patent
Furuta et al.

(10) Patent No.: US 6,992,457 B2
(45) Date of Patent: Jan. 31, 2006

(54) TWO-LEGGED WALDING LOCOMOTION APPARATUS AND ITS WALKING CONTROLLER

(75) Inventors: Takayuki Furuta, Tokyo (JP); Tetsuo Tawara, Tokyo (JP); Yu Okumura, Kanagawa (JP); Hiroaki Kitano, Saitama (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/504,691

(22) PCT Filed: Feb. 7, 2003

(86) PCT No.: PCT/JP03/01324

§ 371 (c)(1),
(2), (4) Date: Aug. 16, 2004

(87) PCT Pub. No.: WO03/068462

PCT Pub. Date: Aug. 21, 2003

(65) Prior Publication Data

US 2005/0088131 A1   Apr. 28, 2005

(30) Foreign Application Priority Data

Feb. 18, 2002   (JP)   ............................ 2002-040837

(51) Int. Cl.
*G06F 19/00*   (2006.01)

(52) U.S. Cl. ...................... 318/568.12; 700/245; 901/1

(58) Field of Classification Search ........... 318/568.12; 700/245, 260; 901/1
See application file for complete search history.

(56) References Cited

U.S. PATENT DOCUMENTS

| 5,151,859 | A | * | 9/1992 | Yoshino et al. ............... 701/23 |
| 5,159,988 | A | * | 11/1992 | Gomi et al. ................. 180/8.6 |
| 5,357,433 | A | * | 10/1994 | Takenaka et al. ............. 701/23 |
| 5,455,497 | A |   | 10/1995 | Hirose et al. .......... 318/568.12 |
| 5,459,659 | A | * | 10/1995 | Takenaka .................... 700/260 |
| 5,936,367 | A | * | 8/1999 | Takenaka ............... 318/568.12 |
| 6,289,265 | B1 | * | 9/2001 | Takenaka et al. ........... 700/245 |
| 2004/0056625 | A1 | * | 3/2004 | Sano et al. ............ 318/568.12 |

FOREIGN PATENT DOCUMENTS

EP   0 406 018   1/1991

(Continued)

*Primary Examiner*—Rita Leykin
(74) *Attorney, Agent, or Firm*—Westerman, Hattori, Daniels & Adrian, LLP

(57) ABSTRACT

A walk controller (30) for a biped (two-footed) walking mobile system, which drive-controls each joint drive motor (15L, 15R–20L, 20R) of each leg portion (13L, 13R) of a biped walking mobile system based on gait data, includes a force detector (23L, 23R) to detect the force allied to a sole of each foot portion (14L, 14R), and a compensator (32) to modify the gait data from a gait former (24) based on the force detected by a force detector, and is constituted so that each force detector (23L, 23R) comprises at least three 3-axial force sensors (36a, 36b, 36c) allocated on a sole of each foot portion (14L, 14R), and a compensator (32) modifies gait data based on the detected signals from three 3-axial force sensors (36a, 36b, 36c) which detect effective force, thereby the walk stability of a robot is realized, even on the unstable road surface condition with complex roughness.

14 Claims, 9 Drawing Sheets

FOREIGN PATENT DOCUMENTS

| | | |
|---|---|---|
| EP | 0 433 091 | 6/1991 |
| JP | 9-212203 | 8/1997 |
| JP | 11-160150 | 6/1999 |
| JP | 2000-254888 | 9/2000 |
| WO | WO 01/74546 | 10/2001 |
| WO | WO 02/100606 | 12/2002 |

* cited by examiner (A)

(B)

(C)

(A)

(B)

TWO-LEGGED WALDING LOCOMOTION APPARATUS AND ITS WALKING CONTROLLER

TECHNICAL FIELD

The present invention relates to a biped (two-footed) walking mobile system, and more specifically to its walk control system which leads to stable walking.

BACKGROUND ART

A conventional biped walking robot generates the pre-designed walk pattern (hereinafter to be called "gait") data, conducts walk control according to said gait data, moves foot portions by the predetermined walk pattern, and thereby realizes biped walking.

However, such a biped walking robot tends to be unstable in walking posture upon walking due, for example, to road surface conditions, or the error of the robot's own physical parameters, or else, and may tumble down in some cases. On the other hand, if a robot is made to conduct walk control without pre-designed gait data while confirming walk conditions in real time, then walking is possible with stable walking posture, but even in such cases, the robot may tumble down with collapsed walking posture, when unexpected road conditions are encountered.

Therefore, what is called ZMP compensation is required, whereby the points on the sole of a foot of the robot where the composite momentum of floor reaction force and gravity becomes zero (hereinafter to be called ZMP "Zero Moment Point") are converged to the target value. As such a control method for ZMP compensation, the method to accelerate and adjust the robot's upper body by utilizing compliance control and converging ZMP to the target value, as shown, for example, in JP 5-305583 A, or the control method to adjust the landing position of the robot's foot is known.

Incidentally, in such control methods, the stabilization of a robot is aimed by ZMP regulation, and in said ZMP regulation there should be a prerequisite to accurately detect floor reaction force at a sole.

However, as for a biped walking robot of such structure, there may be such cases where a whole sole does not land on the road surface in the unstable road condition with complex roughness, and floor reaction force at a sole can not be accurately detected, and thereby ZMP compensation can not be accurately conducted. For this reason, the robot's stability can not be maintained, and the robot's biped walking becomes difficult.

DISCLOSURE OF THE INVENTION

It is the object of the present invention, taking into consideration the above-mentioned problems, to provide a biped walking mobile system and its walk control system to realize walk stability by accurately detecting floor reaction force at a sole in the unstable road condition with complex roughness.

The above-mentioned objective is achieved in accordance with the first aspect of the present invention with the biped walking mobile system, which comprises a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, the drive means for pivotally moving said leg, knee, and foot portions, a gait former to form gait data including target angle orbital, target angle velocity, and target angle acceleration corresponding to the required motion, and a walk control system to drive-control said drive means based on said gait data. Said walk control system includes a force detector to detect the force applied on the soles of respective feet, and a compensator to modify the gait data from a gait former based on the force detected by said force detector, and said force detector comprises at least three 3-axial force sensors allocated on the soles of respective feet, and said compensator modifies the gait data based on the detected signals from three 3-axial force sensors which detect effective force among respective 3-axial force sensors of force detectors.

A biped walking mobile system in accordance with the present invention is preferably provided with said main body which is the upper body of a humanoid robot, and a head portion and both hand portions are attached thereto.

A biped walking mobile system in accordance with the present invention is preferably such that its respective 3-axial force sensor protrudes from a sole downward. Preferably, three 3-axial force sensors are allocated at three tops of an isosceles triangle on a sole of respective foot portion, or each 3-axial force sensor may be allocated on a periphery of a circle with the center on the vertical drive axis of a foot portion on a sole of respective foot portion.

A biped walking mobile system in accordance with the present invention is preferably such that its respective foot portion comprises an base portion attached directly to the lower end of a leg portion, and a toe portion as a finger tip attached pivotally movably vertically to the end of said base portion, and each 3-axial force sensor of a force detector is distributed on an base portion and a toe portion.

A biped walking mobile system in accordance with the present invention is preferably such that one of its 3-axial force sensors is allocated near an base portion, and another 3-axial force sensor is allocated near the tip of a toe portion, and still two other 3-axial force sensors are allocated left and right in the region near the border of an base portion and a toe portion.

A biped walking mobile system in accordance with the present invention is preferably such that said compensator automatically calibrates the detected signals from each 3-axial force sensor by autocalibration.

The above-mentioned objective is also achieved in accordance with the second aspect of the present invention with the biped walking mobile system, which comprises a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, the drive means for pivotally moving said leg, knee, and foot portions. The walk control system of said biped walking mobile system drive-controls said drive means based on the gait data formed by a gait former including target angle orbital, target angle velocity, and target angle acceleration corresponding to the required motion, and comprises a force detector to detect the force applied on the soles of respective feet, and a compensator to modify the gait data from a gait former based on the force detected by said force detector, and said force detector comprises at least three 3-axial force sensors allocated on the soles of respective feet, and said compensator modifies the gait data based on the detected signals from three 3-axial force sensors which detect effective force among respective 3-axial force sensors of force detectors.

A walk control system of a biped walking mobile system in accordance with the second aspect of the present invention is preferably such that its respective 3-axial force sensor protrudes from a sole downward. Also preferably, three 3-axial force sensors are allocated at three tops of an isosceles triangle on a sole of respective foot portion, or each 3-axial force sensor may be allocated on a periphery of a circle with the center on the vertical drive axis of a foot portion on a sole of respective foot portion.

A walk control system of a biped walking mobile system in accordance with the present invention is preferably such that said compensator automatically calibrates the detected signals from each 3-axial force sensor by autocalibration.

According to said aspect, a drive means is drive-controlled by modifying by a compensator the gait data from a gait former based on the force detected by a force detector comprising at least three 3-axial force sensor allocated on a sole of each foot portion. In that case, when a foot portion lands on the road surface with complex roughness, the three 3-axial force sensors protruding downward from a sole steadily contact the road surface. Therefore, the stabilization of a main body, for example, a humanoid robot's upper body can be maintained by accurately modifying the gait data based on the detected signal from three 3-axial force sensors which detect effective force even on unstable road surface. Accordingly, even on unstable road surface with complex roughness, a sole of each foot portion of a robot can maintain the stability of a robot, and make possible steady walk control.

In case that three 3-axial force sensors are allocated at three tops of an isosceles triangle on a sole of respective foot portion, two of the 3-axial force sensors at the both ends of the bottom side of an isosceles triangle are in symmetrical condition, therefore the weight loaded on each 3-axial force sensor can be distributed evenly on left and right, and each 3-axial force sensor can be easily calibrated.

In case that each 3-axial force sensor is allocated on a periphery of a circle with the center on the vertical drive axis of a foot portion on a sole of respective foot portion, the torques around said vertical drive axis are in the same condition, therefore the loads with respect to said torques can be evenly distributed to each 3-axial force sensor, and each 3-axial force sensor can be easily calibrated with respect to the torques.

In case that each foot portion comprises an base portion attached directly to the lower end of a leg portion, and a toe portion as a finger tip attached pivotally movably vertically to the end of said base portion, and each 3-axial force sensor of a force detector is distributed on an base portion and a toe portion, when only an base portion or a toe portion is in contact with the ground, each 3-axial force sensor of a force detector can detect the floor reaction force on a sole.

In case that one of the 3-axial force sensors is allocated near an base portion, and another 3-axial force sensor is allocated near the tip of a toe portion, and still two other 3-axial force sensors are allocated left and right in the region near the border of an base portion and a toe portion, when only an base portion or a toe portion is in contact with the ground, three 3-axial force sensors of a force detector are in contact with the ground, and can accurately detect the floor reaction force on a sole.

In case that said compensator automatically calibrates the detected signals from each 3-axial force sensor by autocalibration, even if the detection accuracy is changed in respective 3-axial force sensor of a force detector due to the surrounding temperature or ageing, autocalibration is conducted, and the floor reaction force can be accurately detected by the detected signals from each 3-axial force sensor of a force detector.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and an understanding thereof, in which drawings.

BEST MODES FOR CARRYING OUT THE INVENTION

Hereinafter, the present invention will be described in detail with reference to suitable forms of embodiment thereof illustrated in the figures.

Figure 1:
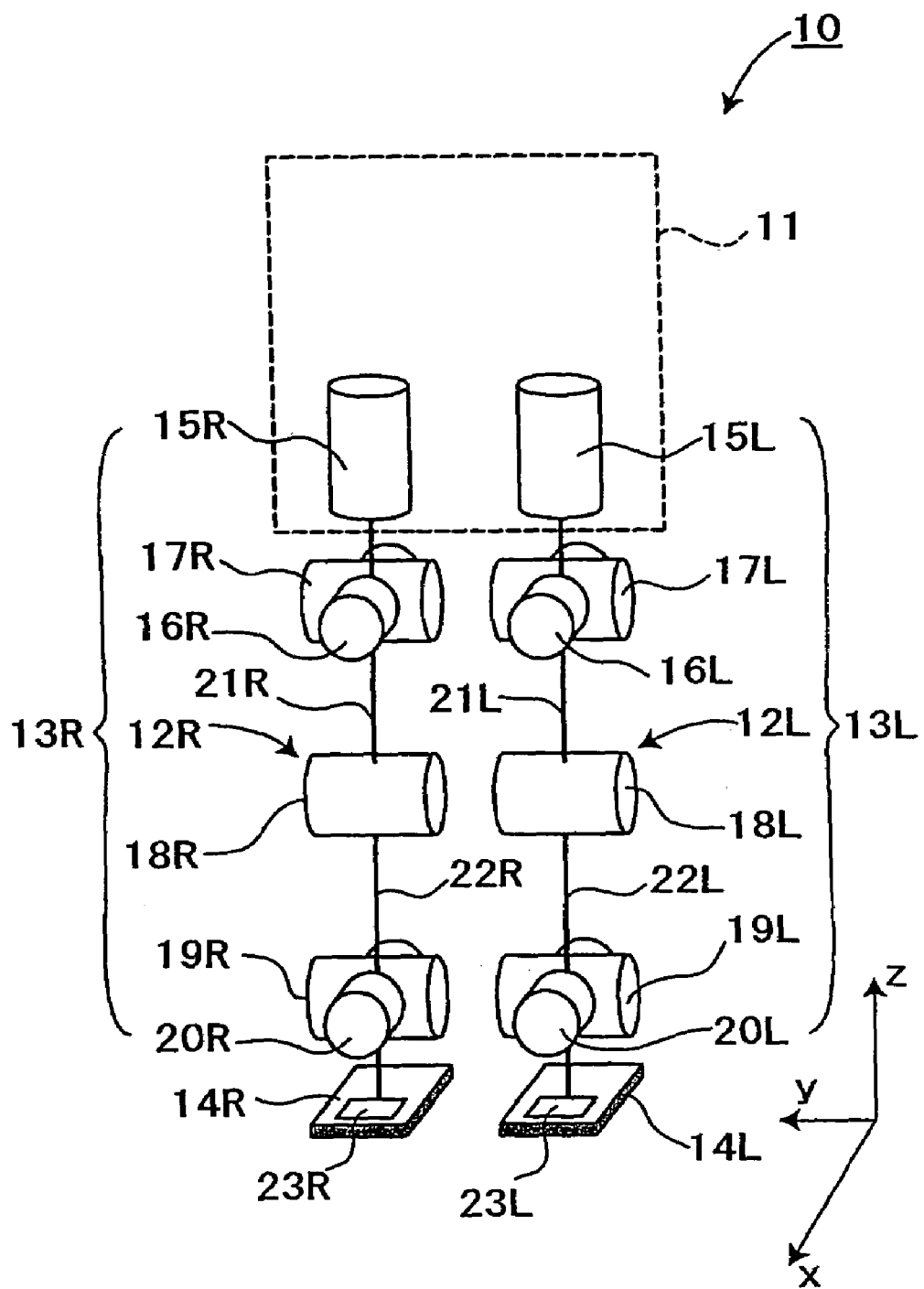
FIG. 1 is a schematic view illustrating the mechanical makeup of a biped walking robot according to the present invention as one form of embodiment thereof.
Figure 2:
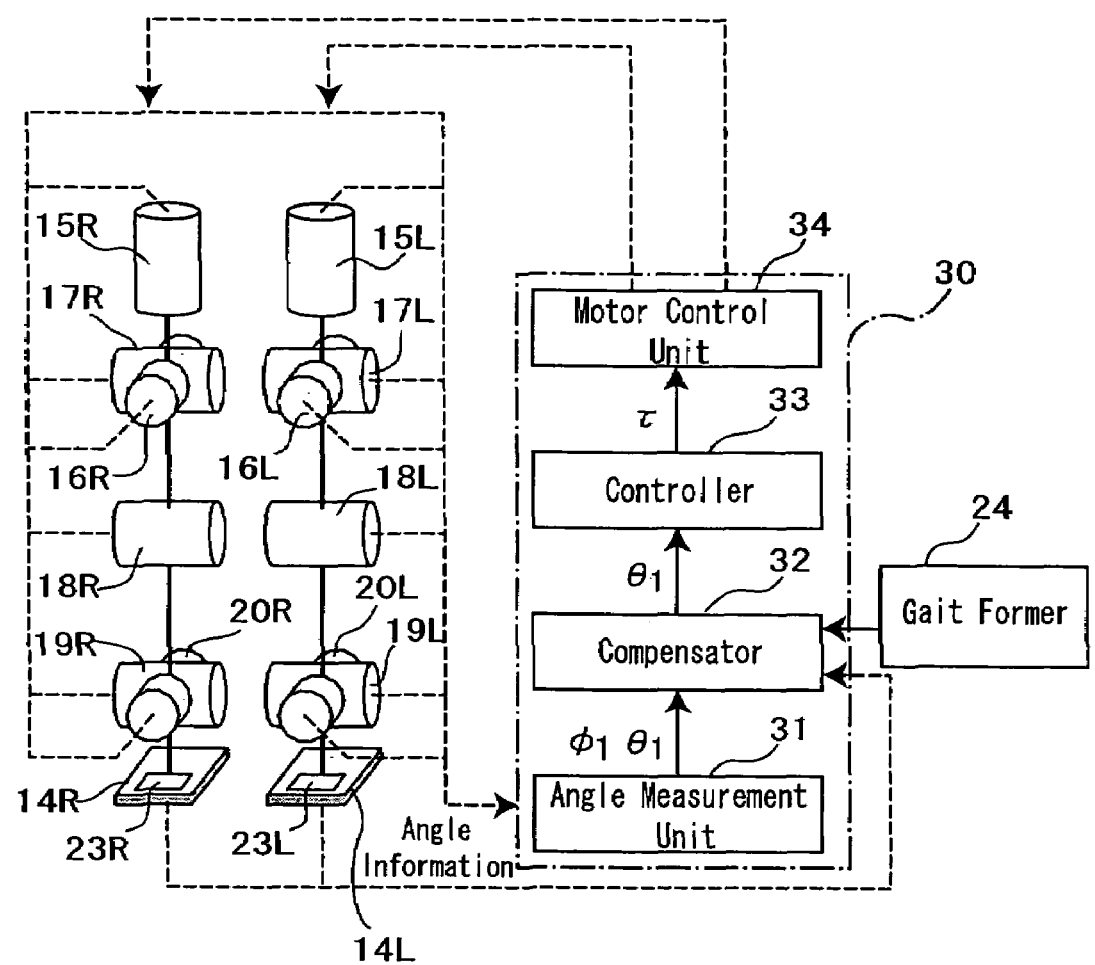
FIG. 2 is a block diagram illustrating the electrical makeup of a biped walking robot shown in FIG. 1.

FIG. 1 and FIG. 2 show the makeup of an embodiment of a biped walking robot with a biped walking mobile system applied thereto in accordance with the present invention. Referring to FIG. 1, a biped walking robot 10 includes an upper body 11 as a main body having at both sides of its lower part a pair of leg portions 13L and 13R attached thereto, each of the leg portions having a knee portion 12L, 12R in its midway, and a foot portion 14L, 14R at its lower end.

Here, each of said leg portions 13L, 13R has six joint portions, namely in the order from above, the joint portion 15L, 15R for the leg portion rotation of a waist (around z axis) with respect to the upper body 11, the joint portion 16L, 16R for the roll direction of a waist (around x axis), the joint portion 17L, 17R for the pitch direction of a waist (around y axis), the joint portion 18L, 18R for the pitch direction of a knee portion 12L, 12R, the joint portion 19L, 19R for the pitch direction of an ankle portion with respect to a foot portion 14L, 14R, and the joint portion 20L, 20R for the roll direction of an ankle portion. Each joint portion 15L, 15R to 20L, 20R is made up with a joint driving motor. Thus, a waist joint comprises said joint portions 15L, 15R, 16L, 16R, 17L, and 17R, and a foot joint comprises joint portions 19L, 19R, 20L, and 20R.

Further between a waist and a knee joints, they are connected with the thigh links 21L, 21R, and between a knee and a foot joints, they are connected with the lower thigh links 22L, 22R. Thus, the leg portions 13L, 13R and the foot portions 14L, 14R at both sides, left and right, of a biped walking robot 10 have six degrees of freedom, respectively, and it is so made up to be capable of walking at will in a three dimensional space by drive-controlling these twelve joint portions during walk with respective drive motors at appropriate angles, and by giving desired motions to whole leg portions 13L, 13R, and foot portions 14L, 14R. Further, said foot portions 14L, 14R are provided with force detectors 23L, 23R on soles (bottom faces). Said force detectors 23L, 23R are to detect, as described below, the forces on respective foot portions 14L, 14R, especially the horizontal floor reaction force F. Here, said upper body 11 is illustrated like a mere box, but actually it may be provided with a head portion or two hands.

FIG. 2 illustrates the electrical makeup of a biped walking robot 10 shown in FIG. 1. In FIG. 2, a biped walking robot 10 is provided with a gait former 24 to form a gait data corresponding to the desired motion, and a walk controller 30 to drive-control the drive means, that is, the joint drive motors 15L, 15R to 20L, 20R of the above-mentioned joint portions based on said gait data.

Here, xyz coordinate system is used as that for a biped walking robot 10 with x direction as anteroposterior direction (forward as +), with y direction as horizontal direction (inner direction as +), and with z direction as vertical direction (upper direction as +).

Said gait former 24 is to form the gait data including the target angle orbital, target angle velocity, and target angle acceleration of respective joint portions 15L, 15R to 20L, 20R necessary for the walk of the biped walking robot 10, based on the desired motion input from outside.

Said walk controller 30 is made up with an angle measurement unit 31, a compensator 32, a controller 33, and a motor control unit 34.

Into said angle measurement unit 31, the angle information of the respective joint drive motor is input by, for example, a rotary encoder or else, provided in the joint drive motor of respective joint portion 15L, 15R to 20L, 20R, the angular position of respective joint drive motor, that is, the state vector $\phi$ with respect to the angle and the angle velocity is measured, and output to the compensator 32. Said compensator 32 calculates the floor reaction force F based on the detected output from a force detector 23L, 23R, modifies the gait data from the gait former 24 based on said floor reaction force F and the state vector $\phi$ from an angle measurement unit 31, and outputs the vector $\theta i$ (i=1 to n, where n is the degree of freedom with respect to a robot 10's walk) to the controller 33. Here, said controller 33 subtracts the angle vector $\theta 0$ at a robot's respective joint portion from the vector $\theta i$ as the gait data modified by the compensator 32, and forms the control signal of each joint drive motor, that is, torque vector $\tau$, based on the vector ($\theta i - \theta 0$). Further, said motor control unit 34 drive-controls each joint drive motor according to the control signal from the controller 33 (torque vector $\tau$).

Figure 3:
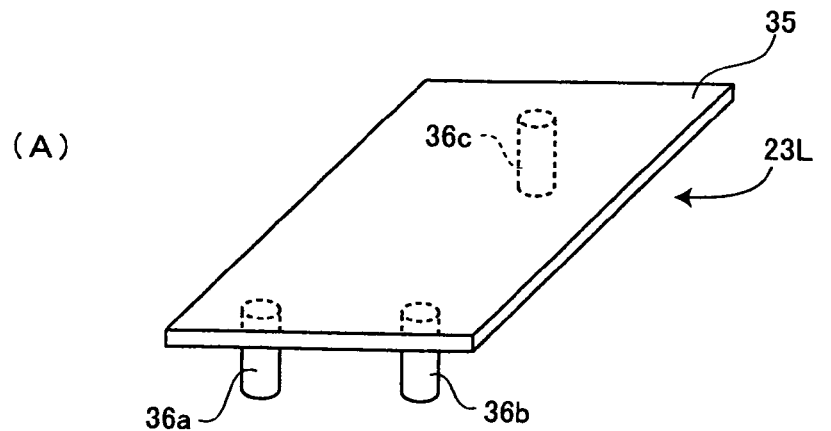
FIG. 3 illustrates the allocation of a 3-axis force sensor allocated on a sole of each foot portion of a biped walking robot shown in FIG. 1, and (A) is the brief perspective view seen diagonally from the upper side, and (B) is the brief perspective view seen diagonally from the lower side.
Figure 3:
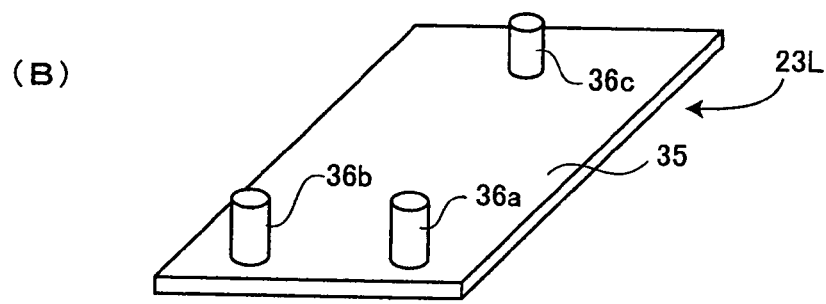

Here, since said force detectors 23L, 23R have a symmetrical makeup left and right, explanation will be given for a force detector 23L only referring to FIG. 3. In FIG. 3, the force detector 23L is made up, on the bottom side of a sole plate 35 as the lower face of the foot portion 14L, of three 3-axis force sensors 36a, 36b, and 36c allocated at the both sides of front rim and the center of rear rim.

Figure 4:
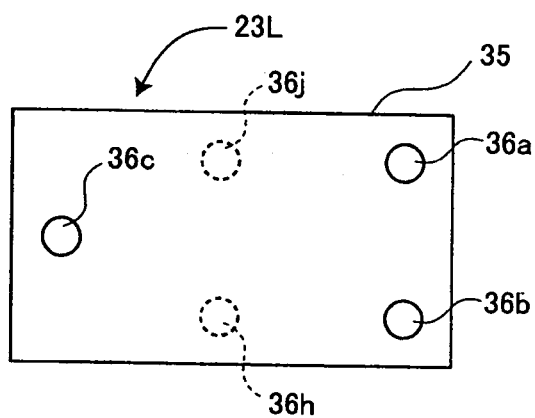
FIG. 4 is a plan view of a sole illustrating the allocation of 3-axis force sensors shown in FIG. 3.

Respective 3-axis force sensors 36a, 36b, and 36c have the mutually identical makeup, and, as shown in FIGS. 3(A) and (B), are made up to protrude downward from a sole. Further, respective 3-axis force sensors 36a, 36b, and 36c are allocated, as shown in FIG. 4, at respective tops of an isosceles triangle with a spired rear rim.

Respective 3-axis force sensors 36a to 36c have data fluctuation for respective detected output, and the detected output varies by the surrounding temperature or ageing. Consequently, the detected outputs of the respective 3-axis force sensors 36a to 36c are automatically calibrated in the compensator 32 by the auto calibration as explained below.

First of all, explanation will be given to the calibration in the direction of Z axis.

Figure 5:
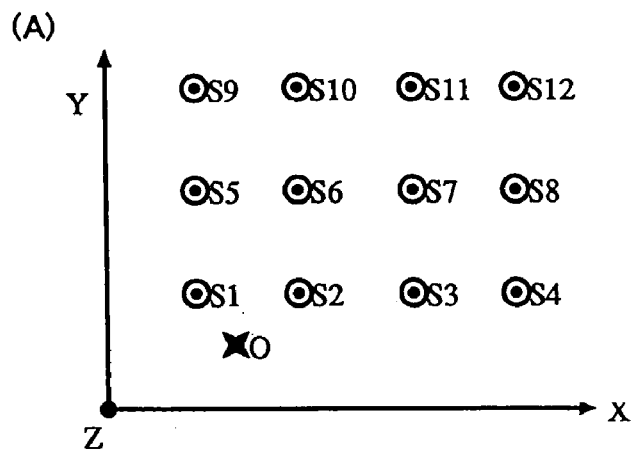
FIG. 5 is a graph illustrating the allocation of each 3-axis force sensor and the base position of force measurement shown in FIG. 4.
Figure 5:
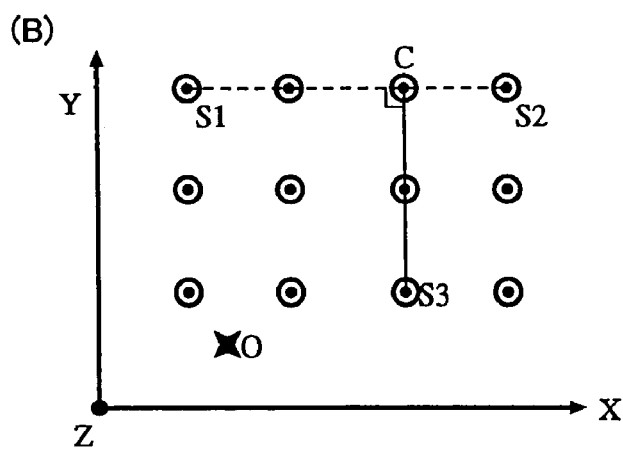
Figure 5:
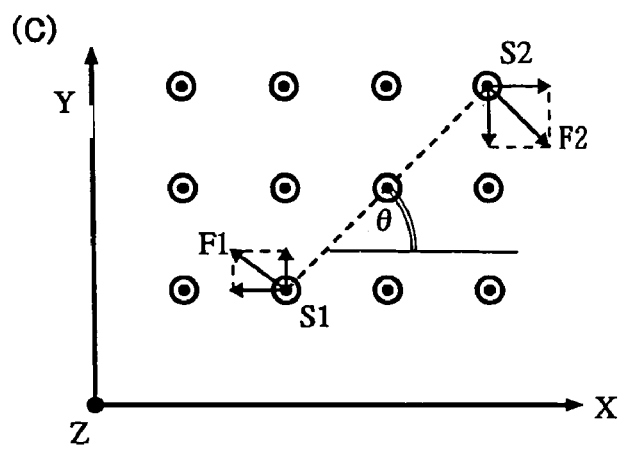

In FIG. 5(A), n 3-axis force sensors S1, S2, S3, - - - , Sn are allocated on a sole with respect to the origin of force measurement O(Ox, Oy). The origin of force measurement O is preferably agreed to the drive coordinate system of, for example, the joint of a foot portion. Here, the position of respective 3-axis force sensor Si is assumed as Si=(X(i), Y(i)), and arbitrary three 3-axis force sensors, for example, S1, S2, and S3 are chosen out of the 3-axial force sensors S1 to Sn distributed as mentioned above, and their coordinate positions are respectively assumed as S1=X(1), Y(1), Z(1), S2=X(2), Y(2), Z(2), S3=X(3), Y(3), Z(3).

The state of three point support is made so that the loads are applied only to said three 3-axis force sensors S1 to S3, and, as shown in FIG. 5(B), arbitrary two 3-axis force sensors among the three, for example, S1 and S2 are connected with a straight line, and the cross point of the perpendicular line from the remaining one 3-axis force sensor S3 to said straight line is assumed as C.

Here, the center of gravity of the driven object is moved statically along said perpendicular line from S3 to C, and then the voltage values output from S1 to S3 are measured. In this case, the more the measurement points, the more accurate is calibration.

Assume f as the measured force, A,B as calibration parameters, V as the voltage value at that instant, M as the total mass of the driven object, g as the acceleration of gravity, and k as the measurement point, then the relating equations are obtained.

$$\begin{cases} f_{z(1)k} = A_1 V_{z(1)k} + B_1 \\ f_{z(2)k} = A_2 V_{z(2)k} + B_2 \\ f_{z(3)k} = A_3 V_{z(3)k} + B_3 \end{cases}$$

$$f_{z(1)k} + f_{z(2)k} + f_{z(3)k} = \text{Mg}$$

$$f_{z(1)k} = f_{z(2)k}$$

$$\begin{cases} f_{z(1)k} \cdot X(1) + f_{z(2)k} \cdot X(2) + f_{z(3)k} \cdot X(3) = 0 \\ f_{z(1)k} \cdot Y(1) + f_{z(2)k} \cdot Y(2) + f_{z(3)k} \cdot Y(3) = 0 \end{cases}$$

And, by assuming V, M, Y as known values and solving these equations as the simultaneous equations of f, and by substituting the obtained result into the equation below, the required slope A of F/V straight line and the intercept B are obtained at the same time. Further, by measuring n times, the calibration parameter for calibration can be calculated.

$$\begin{bmatrix} \sum_{k=0}^{n} 1 & \sum_{k=0}^{n} V_{z(i)k} \\ \sum_{k=0}^{n} V_{z(i)k} & \sum_{k=0}^{n} V_{z(i)k}^2 \end{bmatrix} \begin{bmatrix} B_z(i) \\ A_z(i) \end{bmatrix} = \begin{bmatrix} \sum_{k=0}^{n} f_{z(i)k} \\ \sum_{k=0}^{n} V_{z(i)k} f_{z(i)k} \end{bmatrix}$$

Thus, the calibration in the direction of Z axis with respect to said three 3-axis force sensors S1 to S3 are completed. And, by choosing other different three 3-axis force sensors, repeating calculation of the calibration parameters likewise, and conducting calculation of the calibration parameters for all 3-axis force sensors, the calibration in the direction of Z axis can be completed for all 3-axis force sensors.

Further, the method of calibration with respect to X and Y axes will be explained.

First, as shown in FIG. 5(C), arbitrary two 3-axis force sensors, for example, S1 and S2 are chosen out of the distributed 3-axis force sensors S1 to Sn, and a robot's upper body 11 or the leg portion of the opposite side 13L or 13R are utilized, and thereby the momentum m around Z axis is generated. Here, F1=F2 for the forces F1 and F2 applied on to 3-axis force sensors S1, S2, and momentum m is expressed by the equation below.

$$m = F1 \cdot \sqrt{(X(1)-X(2))^2 + (Y(1)-Y(2))^2}$$

Consequently, forces F1, F2 applied on to individual 3-axis force sensors S1, S2 are calculated, and the respective X and Y components are expressed by the equation below.

$$\begin{cases} f_{x(1)} = F1 \cdot \cos\theta \\ f_{y(1)} = F1 \cdot \sin\theta \\ f_{x(2)} = F2 \cdot \cos\theta \\ f_{y(2)} = F2 \cdot \sin\theta \end{cases}, \text{ where } \theta = a\tan\left(\frac{X(2)-X(1)}{Y(2)-Y(1)}\right)$$

On the other hand, the relationship between the voltage value V output from respective 3-axis force sensors S1, S2 and the forces fx, fy is expressed by the equations below, with k as the number of measurement.

$$\begin{cases} f_{x(1)k} = A_{x(1)} V_{x(1)k} + B_{x(1)} \\ f_{x(2)k} = A_{x(2)} V_{x(2)k} + B_{x(2)} \\ f_{y(1)k} = A_{y(1)} V_{y(1)k} + B_{y(1)} \\ f_{y(2)k} = A_{y(2)} V_{y(2)k} + B_{y(2)} \end{cases}$$

With these equation combined, and by measurements of n times, the determinants as shown below is obtained, and the calibration parameters A, B can be calculated.

$$\begin{bmatrix} \sum_{k=0}^{n} 1 & \sum_{k=0}^{n} V_{z(i)k} \\ \sum_{k=0}^{n} V_{x(i)k} & \sum_{k=0}^{n} V_{x(i)k}^2 \end{bmatrix} \begin{bmatrix} B_x(i) \\ A_x(i) \end{bmatrix} = \begin{bmatrix} \sum_{k=0}^{n} f_{x(i)k} \\ \sum_{k=0}^{n} V_{x(i)k} f_{x(i)k} \end{bmatrix}$$

$$\begin{bmatrix} \sum 1 & \sum V_{y(i)k} \\ \sum V_{y(i)k} & \sum V_{y(i)k}^2 \end{bmatrix} \begin{bmatrix} B_y(i) \\ A_y(i) \end{bmatrix} = \begin{bmatrix} \sum_{k=0}^{n} f_{y(i)k} \\ \sum_{k=0}^{n} V_{y(i)k} f_{y(i)k} \end{bmatrix}$$

Thus, by simultaneously calculating the calibration parameters A, B in the directions of X and Y axes, calibration can be made in the XY axis directions.

Incidentally for the above-mentioned calibration, when respective 3-axis force sensors 36a to 36c are allocated at the tops of an isosceles triangle as shown in FIG. 4, the calibration parameters by calibration have the same value, since the 3-axis force sensors 36a, 36b allocated at both ends of the front bottom side of the triangle are in symmetric position left and right. Therefore, calibration can be easily conducted.

The biped walking robot 10 in accordance with an embodiment of the present invention is made up as described above, and its walking motion is conducted as described below according to the flowchart in FIG. 6.

Figure 6:
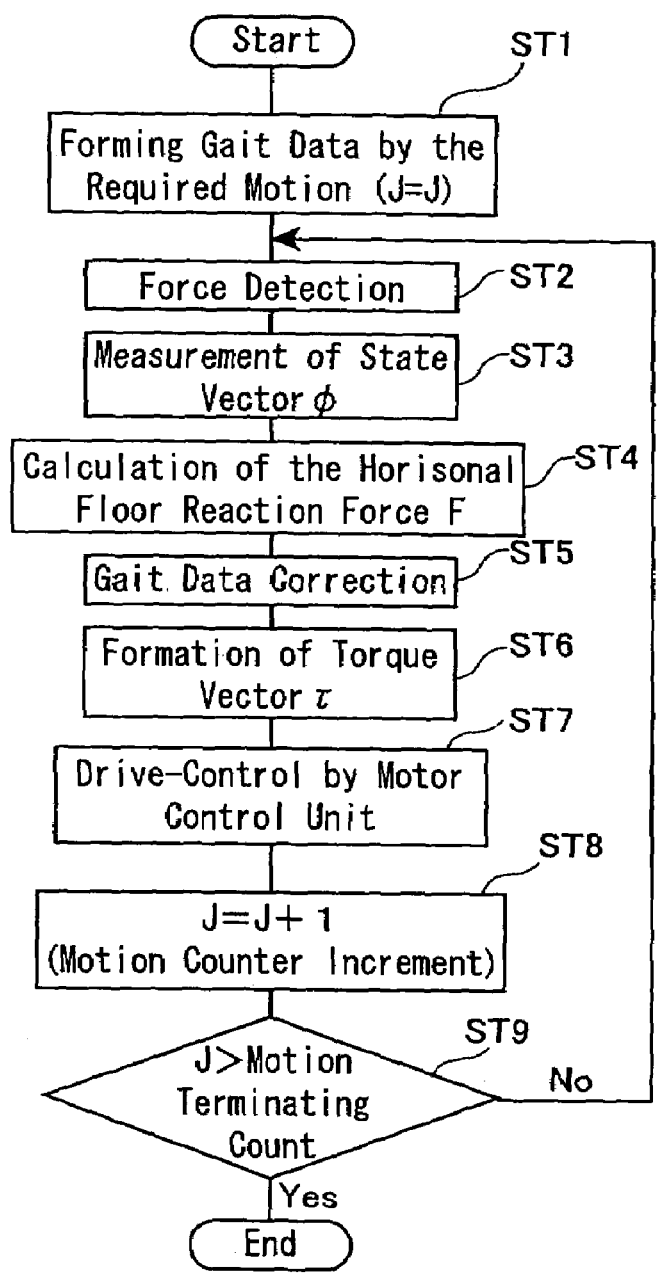
FIG. 6 is a flowchart illustrating the walk control motion of a biped walking robot shown in FIG. 1.

In FIG. 6, first of all by the step ST1, the gait data is formed by the gait former 24 based on the desired motion (J=J) which is input, and then is output to the compensator 32 of the walk controller 30. And by the step ST2, respective forces are detected by force detectors 23L, 23R provided on both foot portions 14L, 14R, and are output to the compensator 32. Also by the step ST3, the state vector φ of respective joint portions 16L, 16R to 20L, 20R is measured by the angle measurement unit 31, and is output to the compensator 32. By the step ST4 which follows, floor reaction force F is calculated by the compensator 32 based on the detected output from the force detectors 23L, 23R. And by the step ST5, the compensator 32 modifies the gait data based on said floor reaction force F and the state vector φ of respective joint portions 16L, 16R to 20L, 20R from the angle measurement unit 31, and outputs θi to the controller 33.

Next by the step ST6, said controller 33 subtracts the angle vector θ0 at a robot's respective joint portion from the vector θi and forms the control signal of each joint drive motor, that is, torque vector τ, based on the vector (θi−θ0), and outputs it to the motor control unit 34. And by the step ST7, said motor control unit 34 drive-controls the joint drive motors of respective joint portions based on said torque vector τ. As a result, the biped walking robot 10 conducts walking motion corresponding to the desired motion.

After that, by the step ST8, the controller 33 makes J=J+1 by motion counter increment, and waits for the pre-set sampling time, thereafter by the step ST9, if said J is below the pre-set motion finishing count, then the step is returned to ST2, and the above-mentioned motion is repeated. And at the step ST9, if said J exceeds the motion finishing count, then the motion is stopped.

In this case, for the biped walking robot 10 to drive-control each joint drive motor, the gait data is modified in the compensator 32 based on the horizontal floor reaction force F by the detected signal from each 3-axis force sensor 36*a*, 36*b*, and 36*c* of the force detectors 23L, 23R allocated on the sole of each foot portion 14L, 14R, and the vector θi is formed, thereby a robot 10's stability can be attained with said horizontal floor reaction force F as regulation. Accordingly, even if a robot 10's each foot portion 14L, 14R, for example, each sole lands on the unstable road surface with complex roughness, each 3-axis force sensor 36*a*, 36*b*, and 36*c* of the force detector 23L, 23R allocated on the sole steadily lands on the ground, and can detect the horizontal floor reaction force F, thereby the walking motion corresponding to the required motion can be made surely possible.

Figure 7:
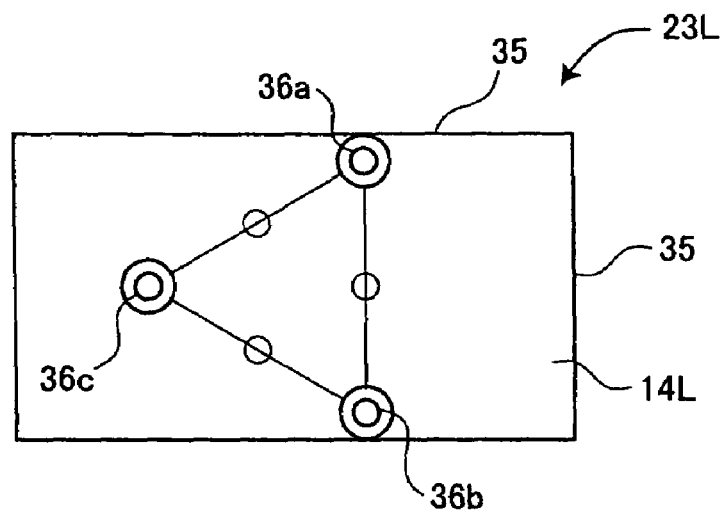
FIG. 7 is a plan view of a sole illustrating the first modified example of the allocation of a 3-axis force sensor shown in FIG. 3(C)
Figure 8:
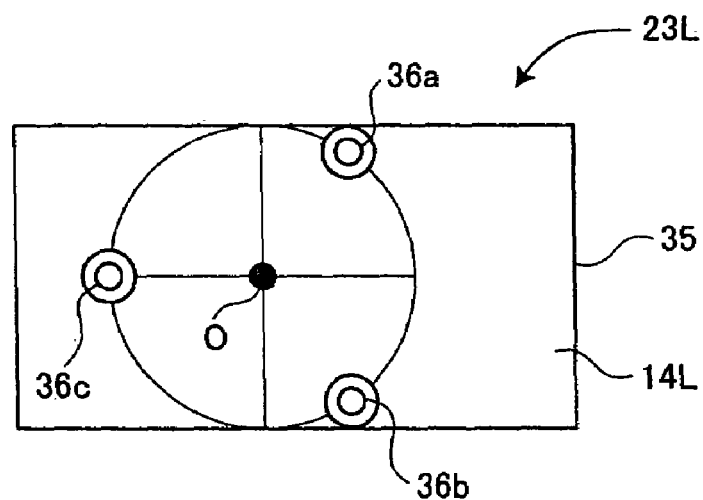
FIG. 8 is a plan view of a sole illustrating the second modified example of the allocation of a 3-axis force sensor shown in FIG. 3(C)

FIG. 7 and FIG. 8 illustrate other examples of the makeup of each 3-axis force sensor of force detectors 23L, 23R described above.

First in FIG. 7, respective 3-axis force sensors 36*a*, 36*b*, and 36*c* are allocated at tops of an equilateral triangle. According to such allocation of 3-axis force sensors 36*a*, 36*b*, and 36*c*, since the loaded weights on respective 3-axis force sensors 36*a*, 36*b*, and 36*c* are uniformly distributed, as well as acting similarly with the 3-axis force sensors 36*a* to 36*c* in FIG. 4, the load is reduced on respective 3-axis force sensors 36*a*, 36*b*, and 36*c*.

In FIG. 8, respective 3-axis force sensors 36*a*, 36*b*, and 36*c* are allocated at tops of an isosceles triangle like in FIG. 4, as well as on a single periphery with the vertical drive axis O with respect to leg portions 13L, 13R of foot portions 14L, 14R as the center. According to such allocation of 3-axis force sensors 36*a*, 36*b*, and 36*c*, they act similarly with the 3-axis force sensors 36*a* to 36*c* in FIG. 4, as well as the torque calibration around said vertical drive axis O can be easily conducted.

Figure 9:
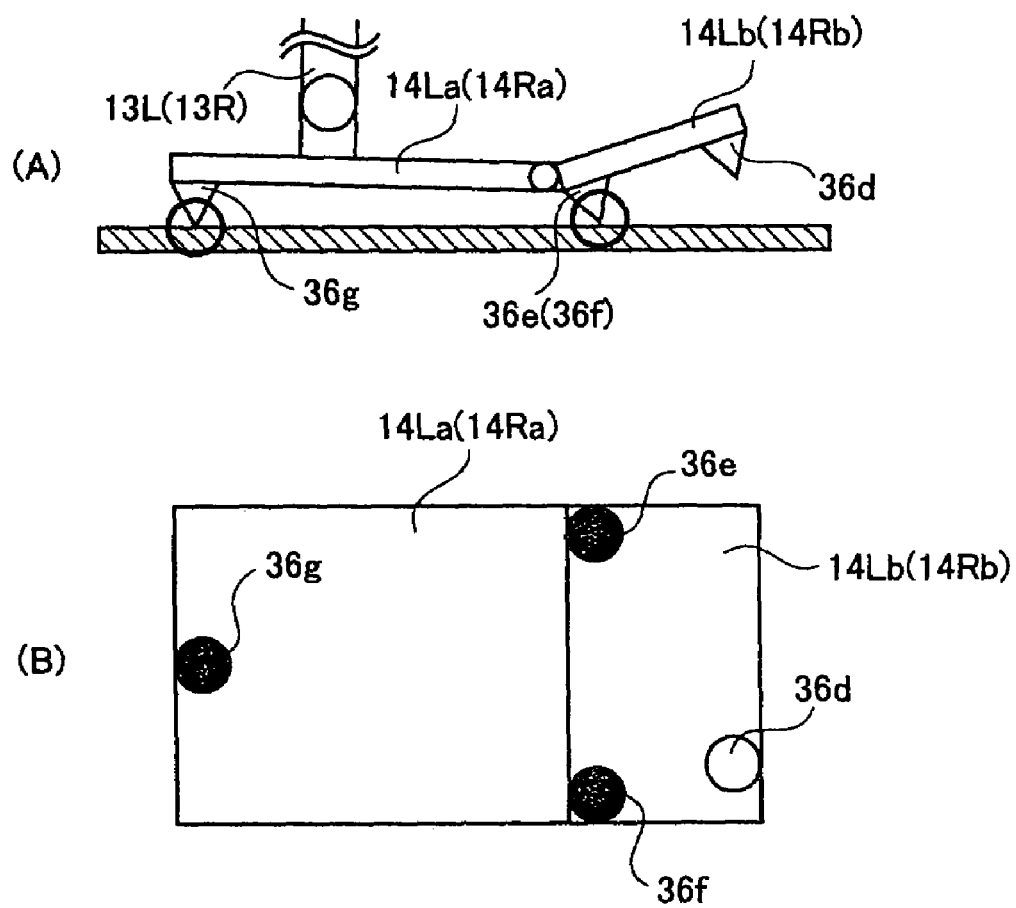
FIG. 9 illustrates the third modified example of the allocation of a 3-axial force sensor shown in FIGS. 3(C), and (A) is a side view of a foot portion, and (B) is a plan view of a sole.
Figure 10:
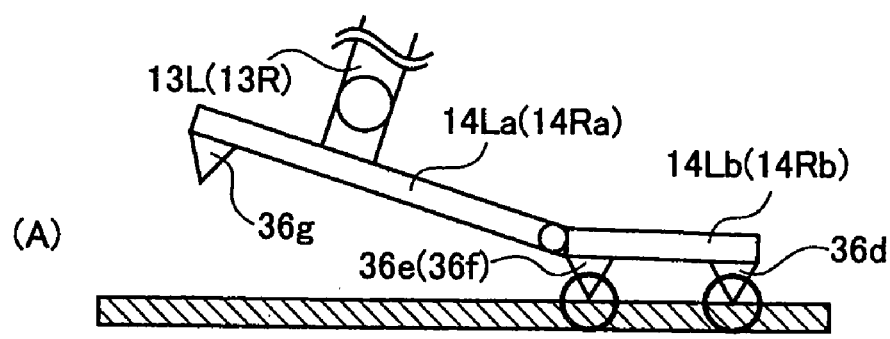
FIG. 10 is, in case of landing at a toe portion in a modified example shown in FIG. 9, and (A) is a side view of a foot portion, and (B) is a plan view of a sole.
Figure 10:
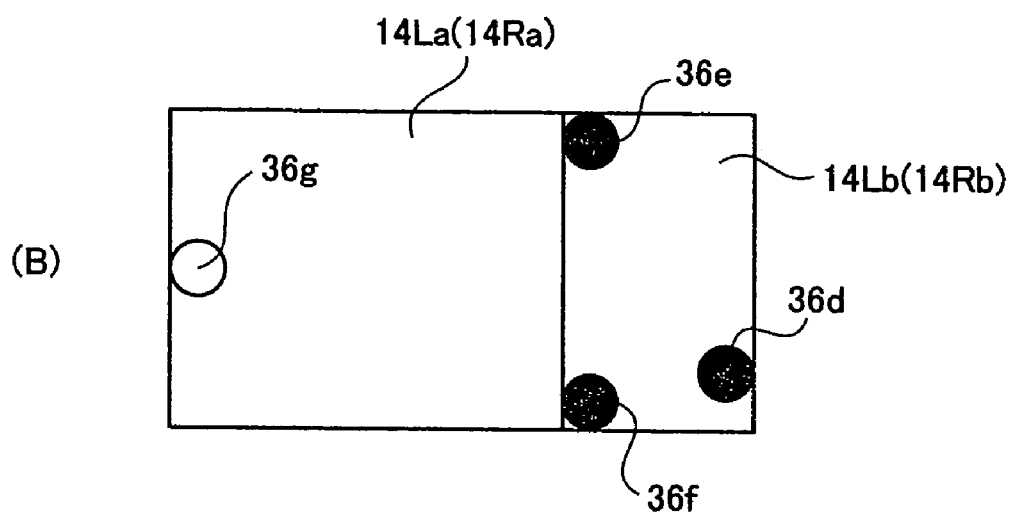
Figure 11:
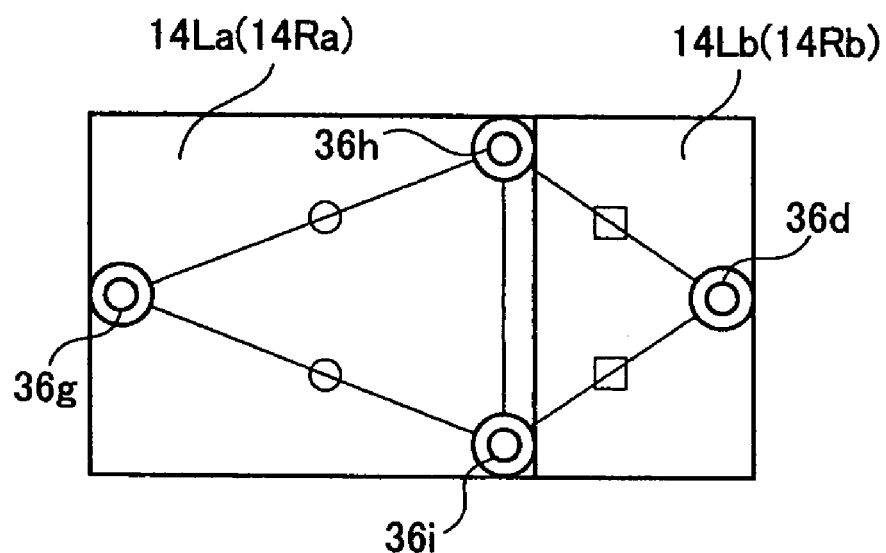
FIG. 11 is a plan view of a sole illustrating the fourth modified example of the allocation of a 3-axis force sensor shown in FIG. 3(C).

FIG. 9 to FIG. 11 illustrate still other examples of the makeup of each 3-axis force sensor of force detectors 23L, 23R described above, and in these makeup examples, each foot portion 14L, 14R comprises each base portion 14La, 14Ra directly attached to each leg portion 13L, 13R, and a toe portion 14Lb, 14Rb as a finger tip pivotally movably attached vertically to each base portion 14La, 14Ra. Here, toe portions 14Lb, 14Rb may be actively pivotable with respect to base portions 14La, 14Ra by drive means like other joint portions, or may be passively pivotable.

In FIG. 9, a toe portion 14Lb, 14Rb is provided with a 3-axis force sensor 36*d* at the position lopsided to the inner side of a tip, and respective 3-axis force sensors 36*e*, 36*f* at the positions near both ends of a rear side, while a base portion 14La, 14Ra is provided with one 3-axis force sensor 36*g* on the heel portion of its rear side.

On the other hand, the compensator 32 chooses the 3-axis force sensor which detects, for example, larger force based on the detected signal of each 3-axial force sensor 36*d* to 36*g* of a force detector 23L, 23R, and modifies the gait data based on the horizontal floor reaction force by three 3-axis force sensors 36*d* to 36*g* which detect effective forces.

According to such allocation of 3-axis force sensors 36*d*, 36*e*, 36*f* and 36*g*, if the base portion 14La, 14Ra of the foot portion 14L, 14R contacts the road surface, then, as shown in FIG. 9(A), three 3-axis force sensors 36*e*, 36*f*, and 36*g*, two 3-axial force sensors 36*e*, 36*f* allocated on the rear side of the toe portion 14Lb, 14Rb, and one 3-axis force sensor 36*g* allocated on the rear side of the base portion 14La, 14Ra, contact the floor surface, bear the loaded weight as shown with the hatched line in FIG. 9(B), and the horizontal floor reaction force is applied from the floor surface. Therefore, the compensator 32 calculates the horizontal floor reaction force based on the detected signals from the above-mentioned three 3-axis force sensors 36*e*, 36*f*, and 36*g*, and modifies the gait data.

On the other hand, in case that only the toe portion 14Lb, 14Rb of the foot portion 14L, 14R contacts the road surface upon the change of walking posture, as shown in FIG. 10(A), three 3-axis force sensors 36*d*, 36*e*, and 36*f* provided at the tip and the rear sides of the toe portion 14Lb, 14Rb contact the floor surface, bear the loaded weight as shown with the hatched line in FIG. 10(B), and the horizontal floor reaction force is applied from the floor surface.

Therefore, the compensator 32 calculates the horizontal floor reaction force based on the detected signals from the above-mentioned three 3-axis force sensors 36*d*, 36*e*, and 36*f*, and modifies the gait data. Thus, even if the contacting state of the foot portion 14L, 14R on to the floor surface is changed upon the change of walking posture, three 3-axis force sensors 36*e*, 36*f*, and 36*g*, or 36*d*, 36*e*, and 36*f* detect the effective force by receiving the horizontal floor reaction force from the floor surface, and the compensator 32 can accurately modify the gait data.

In FIG. 11, as for each 3-axis force sensor 36*d* to 36*g*, by comparison with the case of FIG. 9, 3-axis force sensors 36*h*, 36*i* are each allocated at both ends of a tip of the base portion 14La, 14Ra in place of the 3-axis force sensors 36*e*, 36*f* allocated at both sides of the rear end of the toe portion 14Lb, 14Rb, and a 3-axis force sensor 36*d* of a tip of the toe portion 14Lb, 14Rb is allocated at about a center with respect to the left and right direction. Thus, 3-axis force sensors 36*h*, 36*i* are allocated at each top of an isosceles triangle with respect to a 3-axis force sensor 36*d* or 36*g*.

According to such allocation of 3-axis force sensors 36*d*, 36*h*, 36*i* and 36*g*, they act similarly with the 3-axis force sensors 36*d* to 36*g* in FIG. 9, and can conduct calibration easily for the middle 3-axis force sensors 36*h*, 36*i*, and further, can be more firmly attached to foot portions 14L, 14R by being attached to the base portions 14La, 14Ra which is larger than toe portions 14Lb, 14Rb.

Here in FIG. 11, the middle 3-axis force sensors 36*h*, 36*i* are each provided to both sides of the tip of base portions 14La, 14Ra, but, not limited to this case, may be provided to the connecting region of base portions 14La, 14Ra and toe portions 14Lb, 14Rb.

Thus in case of the biped walking robot 10 according to the embodiment of the present invention, respective 3-axis force sensors 36*a* to 36*c*, or 36*d* to 36*g*, or 36*d*, 36*h*, 36*i*, and 36*g* of force detectors 23L, 23R provided on the soles of respective foot portions 14L, 14R firmly land on to the road surface with complex roughness. Consequently, by modifying gait data based on the horizontal floor reaction force F calculated from the detected signal from each 3-axis force sensor, walk control can be conducted with the horizontal floor reaction force F generated from the friction of a sole with the floor surface as regulation, and the walk stabilization of the robot 10 can be achieved in the unstable road surface state with complex roughness.

In the above-mentioned embodiment, for example, in FIG. 4, FIG. 7, FIG. 8, FIG. 9, and FIG. 11, 3-axis force sensors are allocated symmetrically left and right, but, not limited as such, it may be obviously an allowable case to be allocated at the tops of an inequilateral triangle. Also in the above-mentioned embodiment, 3-axis force sensors are allocated on the bottom side of a plate which makes up each sole, but, not limited as such, it may also be an allowable case that other plate is attached to the lower part of a 3-axis force sensor, and said 3-axis force sensor is inserted between said plates. In this case, said 3-axis force sensor can detect not only compressing force but also pulling force.

Here in such a sensor structure, if each 3-axis force sensor, for example, is allocated in even position on a sole, respectively, with respect to the directions back and forth and left and right, force amplification and calibration are easily conducted, as well as a sensor can be most efficiently used.

Also in the above-mentioned embodiment, for example, in FIG. 4, FIG. 7, and FIG. 8, the force detector 23L, 23R is provided with three 3-axis force sensor 36a, 36b, and 36c, respectively, and in FIG. 9 and FIG. 11, always three 3-axis force sensors 36d, 36e (36h), 36f (36i), or 36e (36h), 36f (36i), 36g of the force detector 23L, 23R land on the floor surface, but not limited as such, three or more 3-axis force sensors may be provided, respectively. For example, as shown with a broken line in FIG. 4, two 3-axis force sensors 36j, 36k may be provided in the middle region. In this case, the compensator 32 compares the detected signals of respective 3-axis force sensors 36a, 36b, 36c, 36j, and 36k, and chooses three 3-axis force sensors which detect larger force, and may calculate the horizontal floor reaction force from the chosen three 3-axis force sensors.

Further in the above-mentioned embodiment, a compensator 32 modifies the gait data with the horizontal floor reaction force as regulation based on the detected signals from respective 3-axis force sensors of the force detectors 23L, 23R, but not limited as such, it may be obviously an allowable case to modify the gait data with ZMP regulation based on the detected signals from respective 3-axis force sensors of force detectors 23L, 23R, as were the past cases.

Further in the above-mentioned embodiment, explanation was given to the case where the present invention is applied to a biped walking robot, but not limited as such, it is obvious that the present invention is applicable to a biped walking mobile system in which other various machines are supported on two legs, and said two legs make it possible to walk.

INDUSTRIAL APPLICABILITY

According to the present invention as described above, a quite excellent biped walking mobile system and a walk control system therfor are provided, which can realize the walk stability by accurately detecting the floor reaction force on soles of a robot, even in the unstable road surface condition with complex roughness.

What is claimed is:

1. A biped walking mobile system comprising;
a main body, a pair of leg portions attached thereto at both sides of its lower part so as to be each pivotally movable biaxially, each of the leg portions having a knee portion in its midway and a foot portion at its lower end, the foot portions being attached to their corresponding leg portions so as to be pivotally movable biaxially, drive means pivotally moving each leg, knee, and foot portion, a gait former to form a gait data including target angle orbital, target angle velocity, and target angle acceleration, and a walk controller to drive-control said drive means based on said gait data,
said walk controller includes a force detector to detect a force applied on a sole of each foot portion, and a compensator to modify the gait data from the gait former based on the force detected by said force detector,
wherein said force detector comprises at least three 3-axis force sensors allocated on the sole of each foot portion, and
wherein said compensator modifies the gait data based on detected signals from three 3-axis force sensors which detect effective force among respective 3-axis force sensors of the force detector.

2. A biped walking mobile system as set forth in claim 1, characterized in that, said main body is a upper body of a humanoid robot provided with a head portion and two hand portions.

3. A biped walking mobile system as set forth in claim 1 or claim 2, characterized in that, each 3-axis force sensor protrudes downward from a sole.

4. A biped walking mobile system as set forth in claim 1 or claim 2, characterized in that, three 3-axis force sensors are allocated at top positions of an isosceles triangle on a sole of each foot portion.

5. A biped walking mobile system as set forth in claim 1 or claim 2, characterized in that, each 3-axial force sensor is allocated on a same periphery with the vertical drive axis of a foot portion as the center on a sole of each foot portion.

6. A biped walking mobile system as set forth in claim 1 or claim 2, characterized in that,
each foot portion comprises an base portion attached directly to the lower end of the leg portion, and a toe portion as a finger tip attached pivotally movably up and down at the end of said base portion, and
each 3-axis force sensor of the force detector is distributed and allocated in the base portion and the toe portion.

7. A biped walking mobile system as set forth in claim 6, characterized in that, one 3-axis force sensor is allocated near a heel of the base portion, another 3-axis force sensor is allocated near a tip of the toe portion, and two other 3-axis force sensors are allocated left and right in the region near the boundary of the base portion and the toe portion.

8. A biped walking mobile system as set forth in claim 1 or claim 2, characterized in that, said compensator automatically calibrates the detected signal from each 3-axis force sensor by auto calibration.

9. A walk controller for a biped walking mobile system to drive-controls drive means based on a gait data including target angle orbital, target angle velocity, and target angle acceleration formed by a gait former corresponding to the required motion, comprising;
a force detector to detect the force applied on a sole of each foot portion, and
a compensator to modify the gait data from a gait former based on the force detected by said force detector,
wherein said force detector comprises at least three 3-axis force sensors allocated on the sole of each foot portion,
wherein said compensator modifies gait data based on the detected signals from three 3-axis force sensors which detect effective force among respective 3-axis force sensors of the force detector, and
wherein the biped walking mobile system comprising a main body, a pair of leg portions attached thereto at both sides of its lower part so as to be each pivotally movable biaxially, each of the leg portions having a knee portion in its midway and a foot portion at its lower end, the foot portions being attached to their corresponding leg portions so as to be pivotally movable biaxially, the drive means pivotally moving each leg, knee, and foot portion.

10. A walk controller for a biped walking mobile system as set forth in claim 9, characterized in that, each 3-axis force sensor protrudes downward from a sole.

11. A walk controller for a biped walking mobile system as set forth in claim 9 or claim 10, characterized in that, three 3-axis force sensors are allocated at top positions of an isosceles triangle on a sole of each foot portion.

12. A walk controller for a biped walking mobile system as set forth in claim 9 or claim 10, characterized in that, each 3-axis force sensor is allocated on a same periphery with the vertical drive axis of a foot portion as the center on a sole of each foot portion.

13. A walk controller for a biped walking mobile system as set forth in claim 9 or claim 10, characterized in that, each 3-axis force sensor is uniformly allocated on a sole of each foot portion with respect to the back and forth direction and the horizontal direction.

14. A walk controller for a biped walking mobile system as set forth in claim 9 or claim 10, characterized in that, said compensator automatically calibrates the detected signal from each 3-axis force sensor by auto calibration.

* * * * *